United States Patent [19]
Tontini

[11] 3,749,316
[45] July 31, 1973

[54] SOUND SUPPRESSING THRUST AUGMENTING APPARATUS

[75] Inventor: Remo Tontini, San Diego, Calif.

[73] Assignee: Rohr Industries, Inc., Chula Vista, Calif.

[22] Filed: June 26, 1972

[21] Appl. No.: 266,156

[52] U.S. Cl... 239/265.13, 239/265.17, 239/265.33, 181/33 HC, 181/33 HD
[51] Int. Cl. ...... B64d 33/06, F01n 1/14, F01n 1/16
[58] Field of Search ..................... 181/33 H, 33 HA, 181/33 HB, 33 HC, 33 HD, 43, 51; 239/127.3, 265.11, 265.13, 265.17, 265.33, 265.37, 265.39, 265.41

[56] References Cited
UNITED STATES PATENTS

| | | | |
|---|---|---|---|
| 3,262,264 | 7/1966 | Gardiner et al. | 181/33 HC |
| 3,566,989 | 3/1971 | Ellis | 239/265.17 |
| 3,579,993 | 5/1971 | Tanner et al. | 181/33 HC |

Primary Examiner—Robert S. Ward, Jr.
Attorney—George E. Pearson

[57] ABSTRACT

An aircraft jet engine is provided with an ejector nozzle which suppresses the jet noise and augments the thrust during takeoff and climb while also optimizing the thrust during cruise. The ejector nozzle is formed as a barrel or ring which is supported in operative position aft of the exhaust nozzle and defines, with the nozzle, inlet passage means for free stream air to enter and mix with exhaust gases in the mixing zone defined by the nozzle. Peripheral auxiliary jet nozzle means inside the ring eject a peripheral jet stream which surrounds and accompanies the mixed gases passing therethrough, adding to the total thrust and further mixing the gases. Jet nozzle means is supplied with energized gas by conduits connected to the engine, which preferably also serve to support the ring to form an integrated ejector nozzle. Supplementary nozzle means at the inner wall of the ring downstream of the auxiliary nozzle means eject a second peripheral jet stream of lower velocity free stream air around the stream from the auxiliary jet to reduce wall friction and shear noise.

10 Claims, 3 Drawing Figures

PATENTED JUL 31 1973 3,749,316

SOUND SUPPRESSING THRUST AUGMENTING APPARATUS

BACKGROUND OF THE INVENTION

This invention lies in the field of gas turbine or jet engines which produce reaction thrust by the high velocity rearward discharge of exhaust gases from the engines. In order to obtain the maximum thrust from the simple engine a great deal of study and calculation goes into the design of the exhaust nozzle, and for best results it must be tailored to the particular installation, taking into account the weight, speed, and other operating characteristics of the airplane on which it is mounted.

One way of increasing the thrust of such an engine is to design it so that the compressor delivers more air than the turbine uses, the excess flowing around the outside of the turbine and joining the turbine exhaust. The mixing of the two gases adds mass to the thrust producing stream and reduces the velocity and temperature thereof, which also reduces the noise level.

Another system which is used extensively includes the provision of an ejector ring which is larger than the exhaust nozzle outlet and is located aft of the nozzle. Free stream air enters the flow path between the exhaust nozzle and the ring and mixes with the exhaust gas, and also with the fan air if the engine is of the fan type. All of the gases mix within the ring with the same general effects mentioned above.

To attain optimum thrust under varying flight conditions of power and speed, the exhaust nozzle is often designed with means to vary the throat area or the discharge cone or both, and many problems arise because of the various moving parts which must operate reliably while being subjected to the flow of the very hot exhaust gas.

SUMMARY OF THE INVENTION

The present invention is directed particularly to the type of aircraft jet engine assembly which incorporates an ejector ring with or without the addition of the fan air feature. It improves the ejector action and makes it possible to use a shorter and lighter ejector ring. In addition, it augments the thrust and decreases the noise, and also allows the addition of mechanism which can perform the function of the variable nozzle with simplicity and reliability.

Generally stated, and in presently preferred forms, the apparatus includes a jet engine having a rearwardly discharging exhaust nozzle which may be conical or of any other type commonly used, the engine being provided with the fan air feature if desired. An ejector ring is located aft of the nozzle and preferably with its entrance end in the vicinity of the exit margin of the exhaust nozzle. Jet nozzle means are arranged peripherally around the inner wall of the ring intermediate its ends to discharge energized gas and form an auxiliary peripheral jet stream to surround and accompany the mixed gases flowing out of the ring.

The jet nozzle means may be a plurality of discrete nozzles or a single peripheral nozzle and may be supplied with gas under pressure by conduit means connected to the engine. However, in the preferred form, the forward portion of the ejector ring is hollow to serve as a plenum chamber and the jet nozzle means is in the form of a substantially continuous slot through the inner wall of the ring through which gas is discharged from the plenum chamber. The energized gas is delivered to the plenum chamber by conduit means connected at their forward ends to the exhaust nozzle and at their aft ends to the plenum chamber, and they may carry turbine gas or fan air or both. Preferably they also serve as support means to connect the ejector ring to the engine. While the ring may be movably mounted for stowing and deploying, its performance is such that this is not necessary, and therefore the conduits serve as rigid means to mount the ring fixedly with respect to the engine to constitute it an integrated ejector nozzle.

The construction described above is disclosed in detail and claimed in my prior application Ser. No. 174,629 filed Aug. 25, 1971, and such disclosure is incorporated herein by reference. The high velocity of the auxiliary jet stream in contact with the aft portion of the wall of the ejector ring results in high friction loss and also in excessive shear noise. To reduce this loss and noise, a supplementary peripheral jet stream is introduced into the ejector ring downstream of the preferably adjacent to the auxiliary jet nozzle to surround the auxiliary jet with a relatively low velocity and low energy jet. This supplementary stream consists of free stream air introduced through the wall of the ejector ring through an inlet flow path and ejected into the mixing zone by a supplementary peripheral jet nozzle. Since the stream has a relatively low velocity, its contact with the wall produces a much lower level of friction loss, and its mixing with the auxiliary stream reduces shear noise and peak velocities.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENTS

Figure 1:
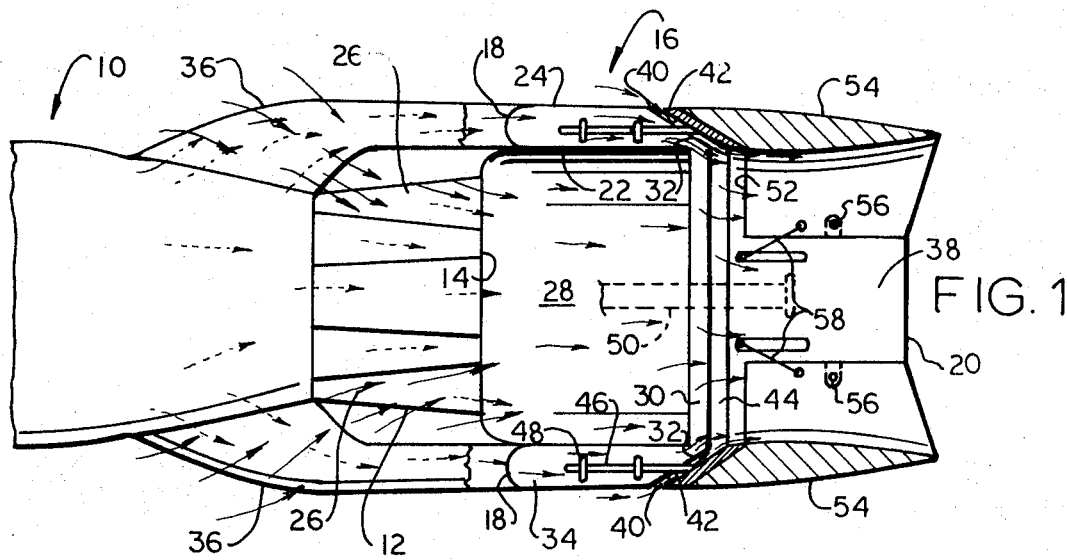
FIG. 1 is a fragmentary schematic view, partly in section, of an engine installation in which the apparatus of the invention is applied to a lobed exhaust nozzle.

An installation incorporating the invention in one form is shown schematically in FIG. 1, in which a jet engine, not shown, is provided with a rearwardly discharging exhaust nozzle 10 having a lobed exit section 12 terminating in an exit plane or trailing edge 14. An ejector member 16, commonly referred to as a ring or nozzle or barrel, is located in operative position aft of the exhaust nozzle 10, with its entrance end 18 located adjacent to the exit plane or trailing edge 14 of the nozzle, its exact fore and aft position being determined for each installation in accordance with operating requirements. The exit end or trailing edge 20 defines the discharge passage or all of the thrust producing gas stream. The ring is generally hollow and is defined by inner and outer walls 22 and 24.

The leading end 18 is spaced from the conical section 12 to define inlet path means 26 for the flow of free stream air into the mixing zone 28 defined by the interior of the ejector ring, where it meets and mixes with the turbine gas exiting from nozzle section 12 as they pass together through the ejector ring. The free stream air adds mass to the turbine gas and the velocity of the total stream is reduced. In addition, since the free stream air is much cooler, the temperature of the final gas mixture is greatly reduced. These factors augment the thrust and substantially reduce the noise level at exit 20.

While these are desirable improvements resulting from the presently known and used ejector ring constructions, they still leave much to be desired. The efficiency must be increased and the noise level must be further decreased. The conventional ejector ring produces an unacceptable thrust loss at cruise because of the shock condition resulting from the very high ratio of pressure and flow speeds between the nozzle gases and the entering free air stream. Consequently, conventional ejector rings must be retracted for cruise with a substantial penalty in the form of weight, complication, and maintenance cost of the components required to stow and deploy the ring and support it adequately in deployed position.

The present invention overcomes these disadvantages by a combination of interacting devices including auxiliary jet nozzle means peripherally arranged around the inner wall 22 of the ejector ring intermediate its ends to discharge energized gas around the periphery of gaseous mixture flowing through the ring. The jet nozzle means may be a plurality of separate nozzles or a single nozzle and may be a separate component mounted in the passage and may be supplied by any conduit means carrying high pressure gas to it from the exhaust nozzle. However, in its most preferred form, it comprises a continuous peripheral slot 30 through the inner wall 22 and communicating with the interior of the ring.

Separate plenum means may be mounted in the ring but preferably a peripheral partition wall 32 extends entirely around the ring and from its inner wall 22 to its outer wall 24 to form plenum chamber 34 within the forward portion of the ring. Conduit means 36 are connected at their forward ends to the exhaust nozzle and at their aft ends to the plenum chamber to supply pressurized exhaust gases to the jet nozzle means 30. These gases may be turbine gas only, fan air only, or any desired mixture of both. In the preferred form, the ring is maintained in the deployed position at all times and the conduits 36 are used to rigidly support it in such position.

Partition wall 32 is preferably formed to converge rearwardly as shown, with the result that the gases issuing from the jet nozzle means have a substantial rearward component. The peripheral outflow performs several important functions. It forms a gaseous shield around the jet stream which serves as a virtual elongation of the ring and reduces noise emission at angles to the thrust axis. It energizes and speeds up the boundary layer to improve the free air stream inflow, in effect pumping in additional air at a higher speed and decreasing the shock effect. By increasing the speed of the radially outer portion of the jet stream, it improves the velocity profile.

As noted above, the peripheral stream issuing from auxiliary jet nozzle 30 has a very high velocity and its contact with wall 22 results in high friction and loss of useful energy. In addition it produces objectionable shear noise. To reduce the loss and noise, a supplementary peripheral stream of gas having lower velocity and energy is introduced between the auxiliary jet stream and the wall. In the form illustrated in FIG. 1, this is accomplished by constructing ejector ring 16 as a forward main body 36 and an aft section 38 spaced rearward of the main body to define a peripheral slot 40 between the aft end or wall 32 of the main body and the leading end 42 of the aft section, which slot serves as an inlet flow path for the flow of free stream air from the exterior to the interior of the ring. The inner portion of the slot serves as a supplementary peripheral jet nozzle 44, and both the slot and the nozzle converge rearwardly to impart a rearward component to the air flow. The free stream air which enters at this zone has a much lower velocity and much lower temperature than the auxiliary stream. Therefore its contact with wall 22 produces a much lower level of friction loss, and there is a correspondingly low friction loss at the boundary between the two peripheral jet streams. The lower velocity ratios at the two faces of the supplementary stream also significantly lower the shear noise. In addition, the mixing of the slower and cooler free stream air with the auxiliary stream reduces peak velocity and temperature and adds further mass to the outflow.

The aft section 38 may be supported on the main body by means of a plurality of peripherally spaced axially extending beams or shafts 46 mounted in support members or bearings 48 in the main body. The aft section may be rigidly held in the spaced position shown but, if it is desired to close the inlet flow path or vary its capacity, shafts 46 may be slidably mounted in bearings 48 and moved fore and aft by actuator shaft 50.

The construction of the ejector ring as described makes it very feasible to incorporate thrust reversal apparatus without comprising any other functions. Aft section 38 is formed with two or more cut-out portions 52 defining gas passages extending laterally from the interior to the exterior of the section and a vane 54 is provided in each passage to close it against gas flow when the vane is in stowed position. Each vane is pivotally mounted intermediate its fore and aft ends at 56 on a transverse axis and may be deployed by actuator links 58 to positions deverging forwardly with their aft ends adjacent to each other to serve as blocker doors. In the deployed position, they obstruct axial flow of the gaseous propulsion stream and divert it laterally out through the gas passages and forwardly to produce reverse thrust.

Figure 2:
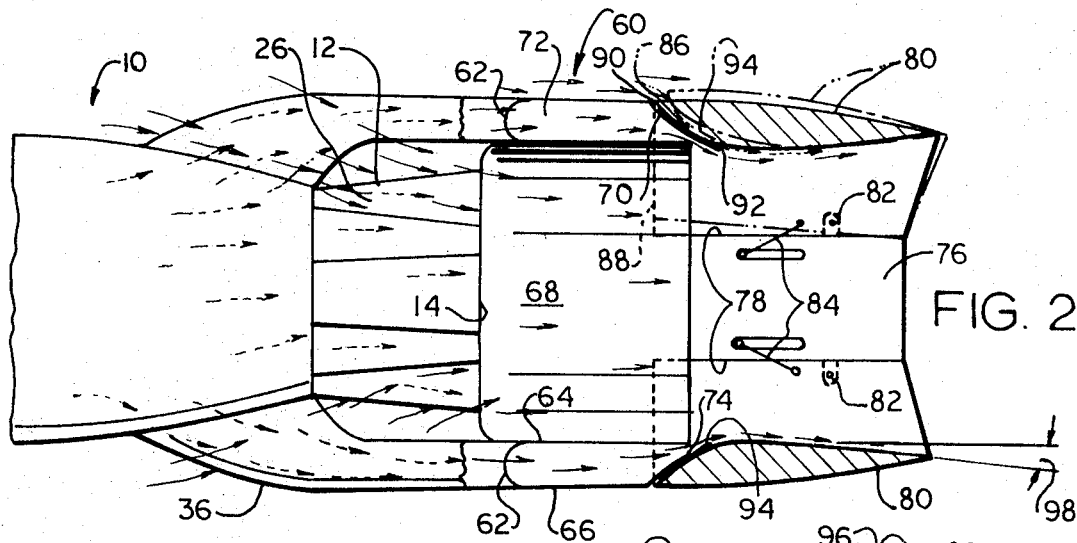
FIG. 2 is a view similar to FIG. 1 showing a modified construction.
Figure 3:
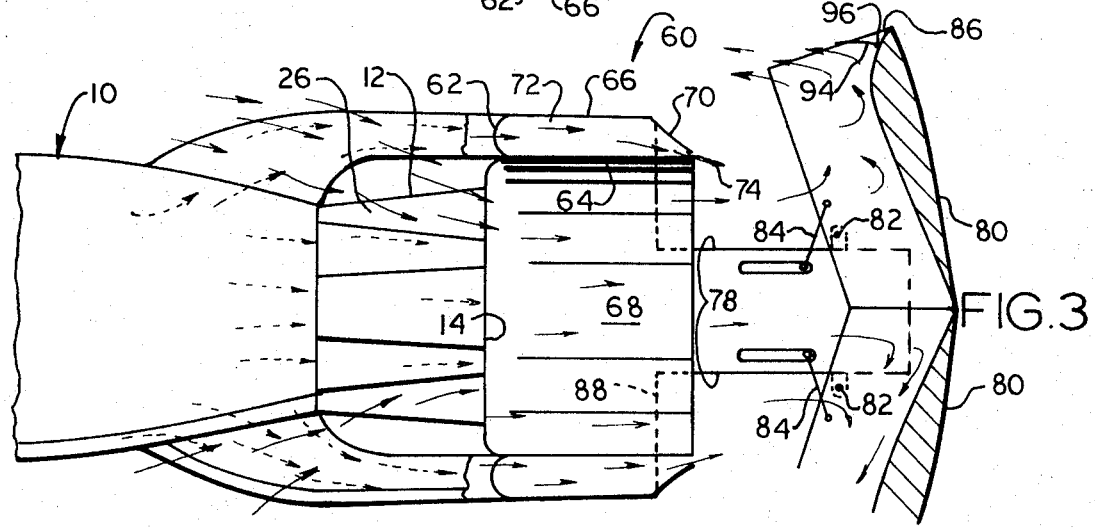
FIG. 3 is a view similar to FIG. 2 with a vane in reverse thrust attitude.

A modified form of the apparatus of the invention is illustrated in FIGS. 2 and 3, in which nozzle 10 with its lobed section 12 and trailing edge 14 and conduits 36 are the same as those of FIG. 1. The ejector ring 60 is a unitary structure with a leading end 62, inner wall 64 and outer wall 66, and is substantially hollow. Forward inlet path means 26 provide for flow of free stream air past nozzle section 12 to mix with the engine gases in mixing zone 68. Inner wall 64 is interrupted intermediate the ends of the ring, and a partition wall 70, converging rearwardly, extends from outer wall 66 of ring 60 toward inner wall 64, substantially closing the hollow forward portion of the ring to define plenum chamber 72 which receives the energized gases from conduits 36. Wall 70 terminates adjacent to the break in inner wall 64 to define therewith a peripheral, rearwardly directed, auxiliary jet nozzle 74 to eject a peripheral jet stream of energized gases supplied by plenum chamber 72, the jet stream surrounding the gaseous mixture in mixing zone 68.

The aft portion 76 of the ejector ring is formed with two or more cut-out portions 78 defining gas passages extending laterally from the interior to the exterior of the ring, and a vane 80 is provided in each passage to close it against gas flow when the vane is in stowed position. Each vane is pivotally mounted intermediate its fore and aft ends at 82 on a transverse axis and may be deployed by actuator links 84 to various positions diverging forwardly to a greater or less extent. As indicated in FIG. 2, the vanes may be deployed a few degrees to space the forward ends 86 from the partition wall or aft end 70 of the forward portion of the ejector ring and also from the forward ends 88 of the gas passages 78. This spacing defines an inlet flow path 90 for entry of free stream air and a supplementary peripheral jet nozzle means 92 to discharge the air into the mixing chamber and around the auxiliary jet stream between it and wall 64 of the ejector ring. Forward ends 86 of the vanes project slightly outward of the ejector ring contour at this time to assist in entraining the free stream air. The inlet flow path and the supplementary jet nozzle means converge rearwardly to impart rearward movement to the supplementary jet stream. The functions and advantageous results obtained with this configuration are the same as in the embodiment first described.

The construction of this form of the invention automatically includes means for producing reverse thrust. Vanes 80 are merely swung to their fully deployed position as indicated in FIG. 3, where they diverge forwardly with their aft ends adjacent to each other to serve as blocker doors. In this position they obstruct axial flow of the gaseous propulsion stream and divert it laterally out through the gas passages and forwardly to produce reverse thrust.

In order to increase the forward diversion of the exiting gases, end plates 94 may be provided which lie flush with the vanes when the latter are stowed and extend at substantial angles as shown when the vanes are fully deployed. The end plates are pivotally mounted to the vanes at 96 and may be positively adjusted by actuating linkage or cammed to flush position by contact with aft end 70 as the vanes are stowed. The action of the exiting gases will cause them to open as the vanes are deployed. Each end plate may be made up of a plurality of individual sections which may be entirely independent or arranged in sliding overlapping relation.

Returning to FIG. 2, it will be noted that the aft portion 76 of the ejector ring and of vanes 80 are configured to produce a predetermined angle of diffusion, indicated at 98, when the vanes are fully stowed, this angle being chosen to produce optimum outflow conditions for cruising flight. As the vanes are moved toward the position for opening the inlet flow path 90 and the supplementary jet nozzle 92 they gradually reduce the angle of diffusion and approach a cylindrical configuration for best results in this mode of operation.

I claim:

1. Apparatus for augmenting the thrust and suppressing the exhaust noise of a jet engine having a rearwardly discharging exhaust nozzle, comprising:

an ejector ring having an entrance end and an exit end;

the ejector ring being located in operative position aft of the exhaust nozzle with its entrance end adjacent to the nozzle exit and spaced at least in part from the nozzle to define inlet path means for the flow of free stream air;

the ring defining a mixing zone for the free stream air and the gas stream issuing from the nozzle;

auxiliary jet nozzle means peripherally arranged around the inner wall of the ejector ring intermediate its ends to discharge energized gas thereinto around the periphery of the gaseous mixture flowing through the ring;

means to supply gas under pressure to the jet nozzle means;

means to form an inlet flow path for the entry of free stream air from the exterior to the interior of the ejector ring;

and supplementary nozzle means peripherally arranged around the inner wall of the ejector ring aft of the auxiliary jet nozzle means and communicating with the inlet flow path to discharge the free stream air in a rearward direction around the energized gas stream from the auxiliary jet nozzle.

2. Apparatus as claimed in claim 1; wherein means are provided to vary the capacity of the inlet flow path between full open and full closed condition.

3. Apparatus as claimed in claim 1; wherein the supplementary nozzle means is configured to cause the free stream air to enter the mixing zone along a rearwardly convergent path.

4. Apparatus as claimed in claim 1; wherein the ejector ring comprises a main body and an aft section;

the leading end of the aft section being spaced rearward of the aft end of the main body to define the inlet flow path and the supplementary nozzle means between them.

5. Apparatus as claimed in claim 4; wherein the aft section is axially movable toward and away from the main body to open, close, and modulate the inlet flow path.

6. Apparatus as claimed in claim 4; where the confronting faces of the aft end of the main body and the leading end of the aft section both converge rearwardly to define a rearwardly convergent inlet flow path and supplementary nozzle.

7. Apparatus as claimed in claim 4; wherein the aft section is formed with a plurality of cut-out portions defining gas passages extending laterally from the interior to the exterior of the section;

and a vane is provided in each passage to close the passage when in stowed position;

each vane being pivotally mounted intermediate its for and aft ends on a transverse axis;

the vanes being swingable to deployed positions diverging forwardly with their aft ends adjacent to each other to serve as blocker doors obstructing axial flow of the gaseous propulsion stream through the exit end of the ejector ring and diverting it laterally out through the gas passages and forwardly to produce reverse thrust.

8. Apparatus as claimed in claim 1; wherein the aft portion of the ejector ring is formed with a plurality of cut-out portions defining gas passages extending laterally from the interior to the exterior of the ejector ring;

and a vane is provided in each passage to close the passage when in stowed position;

each vane being pivotally mounted intermediate its fore and aft ends on a transverse axis;

the vanes being swingable to forwardly divergent attitudes to define the inlet flow path and supplementary nozzle means between the forward ends of the gas passages and the forward ends of the vanes for admission of the free stream air to the interior of the ejector ring.

9. Apparatus as claimed in claim 8; wherein
the aft portions of the inner walls of the ejector ring and the vanes are configured to define an outlet section having a predetermined angle of diffusion with the vanes in stowed position;
and the vanes in attitudes to define the inlet flow path also define an outlet section having a substantially smaller angle of diffusion.

10. Apparatus as claimed in claim 8; wherein
the vanes are further swingable to a fully deployed position diverging forwardly with their aft ends adjacent to each other to serve as blocker doors obstructing axial flow of the gaseous propulsion stream through the exit end of the ejector ring and diverting it laterally out through the gas passages and forwardly to produce reverse thrust.

* * * * *